US009529686B1

(12) United States Patent
Arbel et al.

(10) Patent No.: US 9,529,686 B1
(45) Date of Patent: Dec. 27, 2016

(54) ERROR PROTECTION FOR BUS INTERCONNECT CIRCUITS

(71) Applicant: Xilinx, Inc., San Jose, CA (US)

(72) Inventors: Ygal Arbel, Morgan Hill, CA (US); Sagheer Ahmad, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 167 days.

(21) Appl. No.: 14/527,469

(22) Filed: Oct. 29, 2014

(51) Int. Cl.
*G01R 31/28* (2006.01)
*G06F 11/00* (2006.01)
*G06F 11/30* (2006.01)

(52) U.S. Cl.
CPC .................................. *G06F 11/3027* (2013.01)

(58) Field of Classification Search
CPC ... G06F 11/3027; G06F 11/10; G06F 11/1044; G06F 11/1654; G06F 11/165; G06F 11/1641; G06F 13/4059; G06F 12/0828; G06F 12/0831; G06F 12/0835; G06F 11/0745; G06F 11/0793; H03M 13/19; H04L 49/101; G11C 16/28; G11C 29/025; G11C 29/02
See application file for complete search history.

(56) References Cited

U.S. PATENT DOCUMENTS

| | | | | |
|---|---|---|---|---|
| 5,657,472 A * | 8/1997 | Van Loo | ............ | G06F 12/0828 711/143 |
| 5,915,082 A * | 6/1999 | Marshall | ................ | G06F 11/10 714/11 |
| 6,230,228 B1 * | 5/2001 | Eskandari | ........... | G06F 13/4059 710/310 |
| 6,467,001 B1 * | 10/2002 | Gray | ..................... | H04L 49/101 710/113 |
| 6,732,208 B1 * | 5/2004 | Alsaadi | ............... | G06F 12/0831 710/107 |
| 2007/0260914 A1 * | 11/2007 | Pogrebinsky | ....... | G06F 11/0745 714/5.11 |
| 2008/0098277 A1 * | 4/2008 | Hazelzet | ............... | H03M 13/19 714/753 |
| 2009/0097322 A1 * | 4/2009 | Iioka | ..................... | G11C 16/28 365/185.18 |

* cited by examiner

*Primary Examiner* — Guerrier Merant
(74) *Attorney, Agent, or Firm* — LeRoy D. Maunu

(57) ABSTRACT

In an approach for detecting faults on a bus interconnect that connects a bus master circuit to bus slave circuits, application program code and fault detection program code are concurrently executed by a bus master circuit. The application program code initiates first bus transactions to the bus slave circuits, and the fault detection program code initiates second bus transactions to the bus slave circuits for detection of faults in data channels of the bus interconnect. An error code generator circuit generates error codes from addresses of the first and second bus transactions. The error codes are transmitted with the first and second bus transactions on address channels of the bus interconnect to addressed ones of the bus slave circuits. Respective error code checker circuits coupled between the bus interconnect and the bus slave circuits determine whether or not the addresses of the bus transactions are correct based on the error codes.

18 Claims, 6 Drawing Sheets

302 on each bus master circuit

304 for each bus slave circuit

306 Issue write transaction by the bus master circuit to write a data pattern to reserved storage on the bus slave circuit

308 Issue read transaction by the bus master circuit to read from the reserved storage on the bus slave circuit

310 Data read = data pattern?

yes → (loop back)

no → 312 Signal detection of an error on the data channel

314 Wait and repeat data channel check

FIG. 3

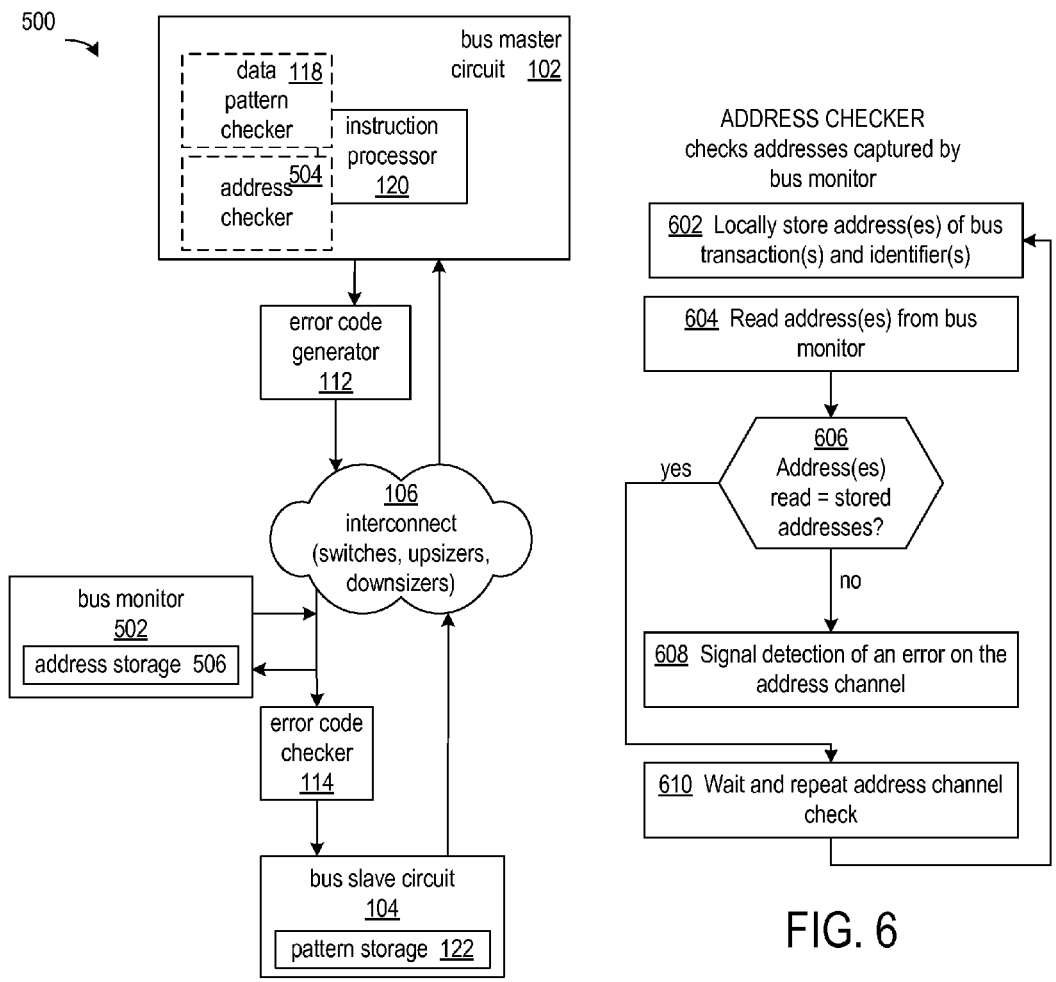

ERROR PROTECTION FOR BUS INTERCONNECT CIRCUITS

FIELD OF THE INVENTION

The disclosure generally relates to detecting errors in bus interconnect circuits.

BACKGROUND

Programmable logic devices (PLDs) are a well-known type of programmable integrated circuit (IC) that can be programmed to perform specified logic functions. One type of PLD, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay lock loops (DLLs), bus or network interfaces such as Peripheral Component Interconnect Express (PCIe) and Ethernet and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Some programmable ICs include hardwired microprocessors on the same chip or in the same package as the programmable interconnect and programmable logic and are sometimes referred to as a system on a chip (SoC). Applications built on SoCs will generally include numerous connections between the microprocessor, programmable logic, and memory and peripheral resources. The connections may be implemented as a number of interconnect busses.

There are different sizes of interconnect busses in many applications, and upsizer and downsizer circuits are used to transition between the different bus sizes. For some applications, such as safety systems, detection of errors on the interconnect buses may be critical. However, the interconnect busses may be implemented using logic provided by third parties, making it unfeasible to modify the bus interconnect circuitry to detect errors.

SUMMARY

A method of detecting faults on a bus interconnect that connects a bus master circuit to bus slave circuits includes concurrently executing application program code and fault detection program code by the bus master circuit. The application program code initiates first bus transactions to the bus slave circuits, and the fault detection program code initiates second bus transactions to the bus slave circuits for detection of faults in data channels of the bus interconnect. An error code generator circuit generates error codes from addresses of the first and second bus transactions transmitted by the bus master circuit. The error codes are transmitted with the first and second bus transactions on address channels of the bus interconnect to addressed ones of the bus slave circuits. Respective error code checker circuits that are coupled between the bus interconnect and the bus slave circuits determine whether or not the addresses of the bus transactions are correct based on the error codes.

A circuit arrangement includes a bus interconnect circuit having address channels and data channels. A bus master circuit is configured to concurrently execute application program code and fault detection program code. The application program code initiates first bus transactions, and the fault detection program code initiates second bus transactions for detection of faults in data channels of the bus interconnect. An error code generator circuit couples the bus master circuit to the bus interconnect circuit and is configured to generate for each of the first and second bus transactions, an error code from an address of the bus transaction and transmit the error code on one of the address channels. A plurality of error code checker circuits couple a plurality of bus slave circuits to the bus interconnect circuit, respectively. Each error code checker circuit is configured to determine whether or not the address of each received one of the first and second transactions is correct based on the error code.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which:

FIG. 3 is a flowchart of a process performed by software in checking for errors on the data channel;

FIG. 5 shows the system of FIG. 1 in combination with a bus monitor for checking for errors on the address channel; and FIG. 6 is a flowchart of a process for checking for errors on the address channel using the bus monitor.

DETAILED DESCRIPTION OF THE DRAWINGS

Figure 1:
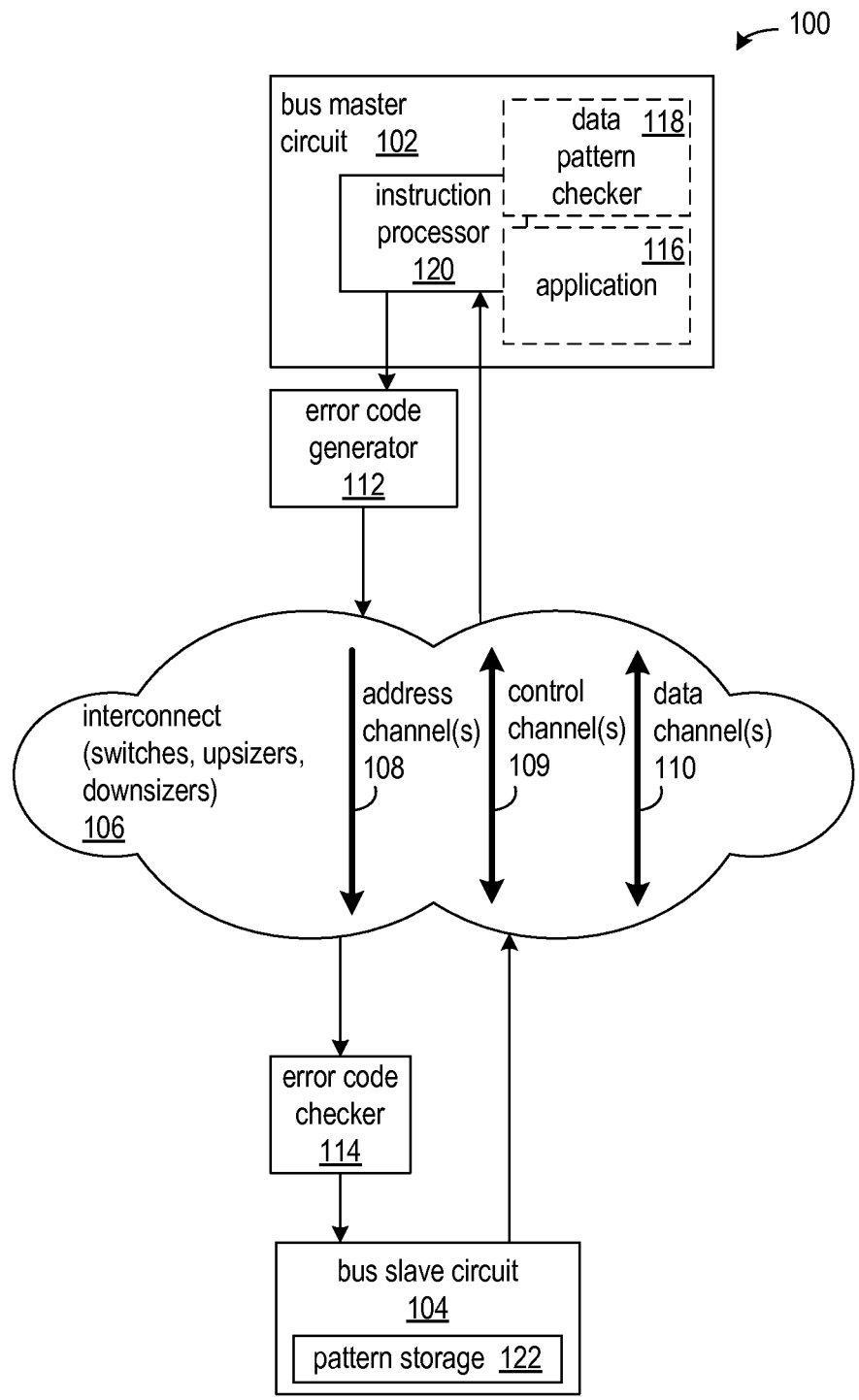
FIG. 1 shows a system having a bus master circuit coupled to a bus slave circuit through bus interconnect circuitry.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed circuits provide detection of errors that might occur in bus interconnect circuitry. The disclosed approaches are suitable for applications in which implementing error-check circuitry within the bus interconnect circuitry is difficult or unfeasible. In one implementation, both hardwired circuits and software are used to detect errors in the bus interconnect circuitry. Hardwired circuits are used for detecting errors in address and command/control channels of the bus interconnect circuitry, and software is used for detecting errors in the data channels of the bus interconnect circuitry.

The error detection circuits and software are implemented outside the bus interconnect circuitry, thereby providing error detection for bus interconnect circuitry that is not amenable to modification for error detection. Being outside the bus interconnect circuitry, the error detection circuits and software can avoid having to account for any upsizing or downsizing that may be done in the bus interconnect. For each bus master circuit, an error code generator circuit couples the bus master circuit to the bus interconnect circuit. The error code generator circuit generates an error code from an address of each bus transaction and transmits the error code on an address channel of the bus interconnect circuitry. For each bus slave circuit, an error code checker circuit couples the bus slave circuit to the bus interconnect circuit. The error code checker circuit determines whether or not the address of each received bus transaction is correct based on the error code specified by the error code generator circuit.

Errors on the data channels of the bus interconnect circuitry are detected by software executing on the bus master circuit(s). Each bus master circuit concurrently executes application program code and fault detection program code. Both the application program code and the fault detection program code issue bus transactions directed to slave bus circuits that are connected to the bus interconnect circuitry. The fault detection program code issues bus transactions for verifying correct operation of the data channels to the bus slave circuits.

FIG. 1 shows a system 100 having a bus master circuit 102 coupled to a bus slave circuit 104 through bus interconnect circuitry 106. The error checking on the address and command/control channels is performed by hardwired circuits and error checking on the data channel is performed by software. Though only one bus master circuit and one bus slave circuit are shown, it will be recognized that the system may have multiple bus master circuits and multiple bus slave circuits. Bus interconnect circuitry 106 includes an address channel 108, a command/control channel 109, and a data channel 110 though the signal lines are not individually shown. In systems having multiple bus master circuits and bus slave circuits, the bus interconnect will include multiple address channels and multiple data channels. The address channel includes signal lines that carry address signals from the bus master circuit 102, through the bus interconnect 106, to the bus slave circuit 104. The command/control channel similarly includes signal lines between the bus master circuit and the bus slave circuit through the bus interconnect. The data channel includes signal lines that carry data, for example, data to be written to the bus slave circuit by the bus master circuit or data read from the bus slave circuit by the bus master circuit.

The bus interconnect circuitry 106 may include multiple busses of different sizes. That is, the bit width of the busses may be different. For example, there may be 16-bit, 32-bit, 64-bit, and 128-bit busses that implement the bus interconnect. To accommodate the different sizes of busses, the bus interconnect circuitry may include upsizer circuits, downsizer circuits, and numerous switches.

Hardwired circuits are employed to detect errors in the address and command/control channels, and software is employed to detect errors in the data channels. In the system 100, error code generator circuit 112 and error code checker circuit 114 detect errors in the address and command/control channel between the bus master circuit 102 and the bus slave circuit 104. The error code generator couples the bus master circuit to the bus interconnect circuitry 106. Bus transactions issued by the bus master circuit flow through the error code generator. For each of the bus transactions, the error code generator circuit generates an error code based on the address in the bus transaction. For example, the error code may be a parity bit or an error correction code (ECC).

The error code checker circuit 114 couples the bus slave circuit to the bus interconnect circuitry. The error code checker circuit determines whether or not the address of each received transaction is correct based on the error code. The error code checker circuit 114 may be configured to indicate the detection of an error to the bus slave circuit. For example, in response to determining the address of a bus transaction is incorrect, the error code checker circuit may indicate the bus transaction is invalid by specifying bit values in the bus transaction. Alternatively, the error code checker circuit may change the address of the bus transaction to an undefined address in response to determining the address of the bus transaction is incorrect.

Though the error code generator circuit 112 is shown as being external to the bus master circuit 102, and the error code checker circuit 114 is shown as being external to the bus slave circuit, it will be recognized that the error code generator could be integrated within the bus master circuit, and the error code checker could be integrated within the bus slave circuit.

The bus master circuit 102 executes application program code 116 concurrently with data pattern checker program code 118 in an instruction processor 120 for detecting errors on the data channels of the bus interconnect circuitry 106. The data pattern checker program code 118 implements a fault detection program. Both the application program code and data pattern checker program code issue bus transactions to the bus slave circuit 104 and are shown with dashed lines to signify program code executing on the instruction processor. The data pattern checker program code issues write transactions and read transactions for writing to and reading from a memory location or register of the bus slave circuit. The memory location or register is shown as pattern storage 122. The address of the memory location of the slave circuit may be dedicated to the fault detection program code. In order to avoid interfering with execution of the application program code 116, the data pattern checker program code periodically issues the write and read transactions. For example, the data pattern checker program code may be configured to issue a write transaction and a read transaction, wait for a period of time specified by a configuration parameter, and repeat the cycle of issuing transactions and waiting.

In an example implementation, each write transaction specifies a data pattern, such as a pattern of alternating logic 0 s and logic 1 s. After the write transaction, the data pattern checker issues a read transaction to read back the value from the bus slave circuit. The data pattern may be changed from one cycle to the next. The data pattern checker determines whether or not there is an error on the data channel by checking whether or not data returned from the read transaction matches the data pattern.

Figure 2:
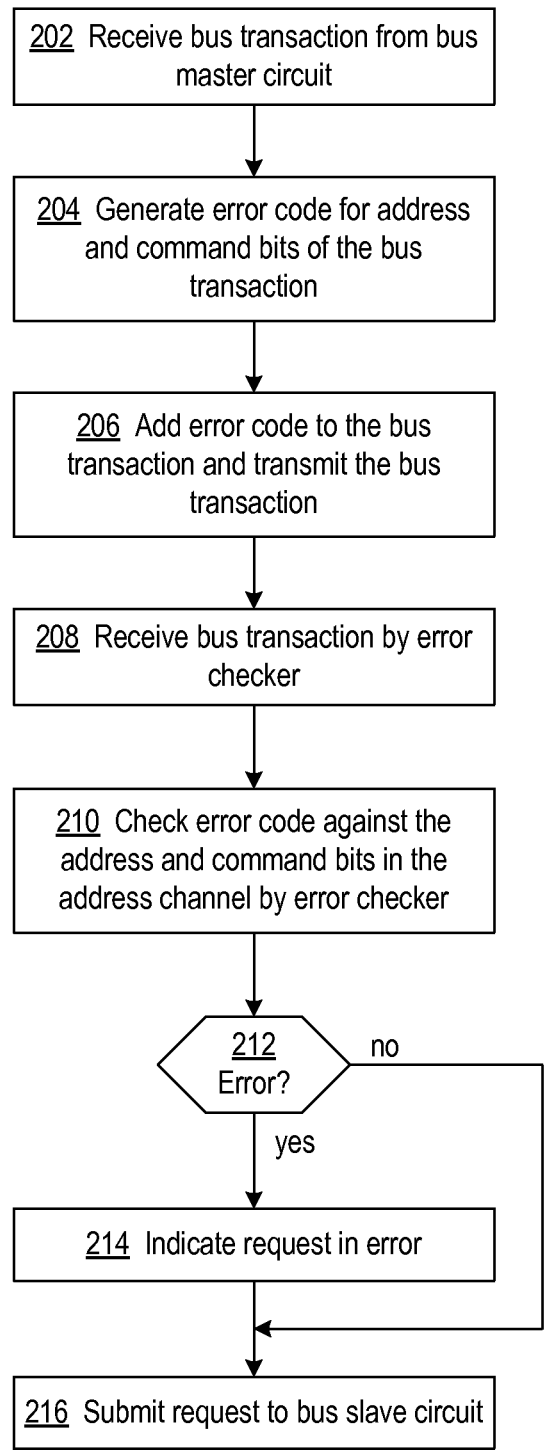
FIG. 2 is a flowchart of a process performed by the hardwired circuits in checking for errors on the address channel.

FIG. 2 is a flowchart of a process performed by the hardwired circuits in checking for errors on the address channel. At block 202, the error code generator circuit (FIG. 1, 112) receives a bus transaction from the bus master circuit. At block 204, the error code generator circuit generates an error code based on the address and command/control bits of the bus transaction. The error code may be a parity bit or an ECC, for example. The error code is added to the bus transaction and the bus transaction is transmitted at block 206. The error code may be added as part of the user bits of the bus transaction, for example.

At block 208, the error checker circuit (FIG. 1, 114) receives the bus transaction, and at block 210, the error checker circuit checks the error code against address and command/control bits of the bus transaction. If the error code indicates there is an error in the address and command/control bits received on the address channel, decision block 212 directs the process to block 214. Otherwise, the process proceeds to block 216.

At block 214, the error checker circuit indicates an error in the bus transaction. The error may be indicated by specifying bit values in the bus transaction that indicate the address is invalid or by changing the address of the one of the bus transactions to an undefined address.

FIG. 3 is a flowchart of a process performed by software in checking for errors on the data channel. The process of FIG. 3 may be executed concurrently with an application program on a bus master circuit (FIG. 1, 102) in order to verify correct operation of the data channels at runtime. The process 302, which illustrates the data pattern checker 118 (FIG. 1), may be executed on each bus master circuit in the system, and for each bus slave circuit (FIG. 1, 104) coupled to the bus master circuit, the operations within block 304 are performed.

At block 306, a bus write transaction is issued from the bus master circuit. The write transaction specifies a data pattern, such as alternating 0 and 1 bits, and an address of a reserved storage location at the bus slave circuit. The data pattern may be stored in working memory of the data pattern checker for subsequent comparison. The reserved storage location may be a register or an address in an addressable memory that is dedicated for use by the data pattern checker. The write transaction is followed by a bus read transaction at block 308. The read transaction specifies the same address as the write transaction of block 306.

If the data returned in response to the read transaction is not equal to the data that was specified in the write transaction, decision block 310 directs the process to block 312. Otherwise, the process is directed to block 314. At block 312, the process signals that an error was detected on the data channel. The error may be signaled by a processor interrupt or with a value written to a status register or memory location.

At block 314, the process waits before repeating the data channel check. In an example implementation, the data channel check is performed periodically. The process waits for a period of time that may be specified by a configuration parameter before returning to block 306 to repeat the process. In an example implementation, the data pattern written at block 306 may be changed with each cycle in order to test different values on the signal lines of the data channel.

Figure 4:
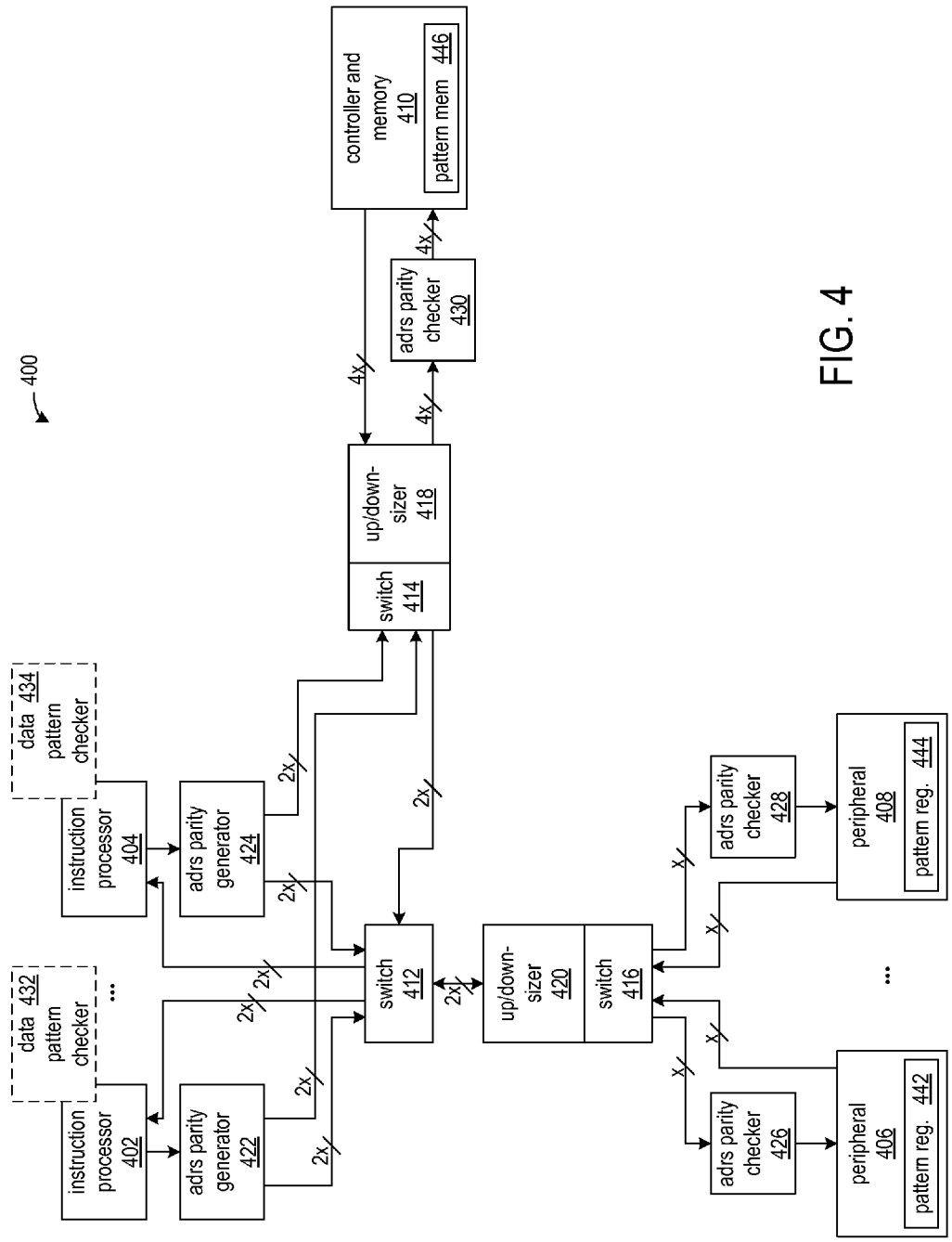
FIG. 4 shows a system in which the error checking hardware and software shown in FIG. 1 are used with a bus interconnect having switches, upsizers, and downsizers.

FIG. 4 shows a system 400 in which the error checking hardware and software shown in FIG. 1 are used with a bus interconnect having switches, upsizers, and downsizers. The system includes instruction processors 402 through 404 as examples of bus master circuits and peripherals 406 through 408 and controller and memory 410 as examples of bus slave circuits. The bus interconnect circuit is implemented with switches 412, 414, and 416 and up/downsizer circuits 418 and 420.

Respective address parity generators 422 and 424 couple the instruction processors 402 and 404 to the switch 412, and respective address parity checkers 426, 428 and 430 couple the peripherals 406 and 408 and controller and memory 410 to the switches 416 and 412. The address parity generators are examples of the error code generator circuit 112 (FIG. 1), and the address parity checkers are examples of the error code checker circuit 114 (FIG. 1).

Each of the instruction processors 402 through 404 executes a respective data pattern checker program concurrent with execution of an application program. For example, instruction processor 402 executes data pattern checker program 432, and instruction processor 404 executes data pattern checker program 434. The peripherals 406 and 408 and controller and memory 410 have dedicated storage that is used by the data pattern checker programs. For example, peripheral 406 has one or more pattern registers 442, peripheral 408 has one or more pattern registers 444, and controller and memory have pattern memory 446. Each of the data pattern checker programs 432 and 434 has a dedicated storage location in each bus slave circuit it accesses. Thus, for example, the pattern memory 446 in the controller and memory may have separate locations for the data pattern checker programs 432 and 434.

The up/downsizer circuits 418 and 420 translate and format bus transactions from one size channel to another size channel. The channels between the switch 416 and the peripherals 406 and 408 are denoted as having a base size of x bits. The channels between the instruction processors 402 and 404 and the switch 412 are 2x bits wide, and the channels input to and output from the controller and memory 410 are 4x bits wide. Up/downsizer circuit 420 translates and formats bus transactions between a 2x-bit wide channel, and an x-bit wide channel. Up/downsizer circuit 418 translates and formats bus transactions between a 4x-bit wide channel, and a 2x-bit wide channel. Having the circuits that verify the address channels and the software that verifies the data channels outside the bus interconnect, avoids having to modify the bus interconnect design for error checking support. However, in implementations in which the up/downsizer circuits within the interconnect split or combine transactions, and the splitting or combining of transactions modify bits on the address and command/control channels, regeneration of the error codes would be required.

FIG. 5 shows the system of FIG. 1 in combination with a bus monitor for checking for errors on the address channel. The system 500 includes a bus monitor circuit 502 and address checker program code 504. Each of the bus slave circuits in a system may have a dedicated bus monitor circuit for verifying the address channel to that bus slave circuit. The address program code 504 and data pattern checker program code 118 implement a fault detection program.

The bus monitor circuit 502 is coupled between the bus interconnect 106 and the bus slave circuit 104 and captures the addresses of bus transactions transmitted to the bus slave circuit. The bus monitor circuit stores the captured addresses in address storage 506, which may be a first-in-first-out (FIFO) buffer or addressable memory, for example. The address checker software, executing on the instruction processor 120, captures the addresses of bus transactions as the transactions are issued by the instruction bus master circuit 102, and reads the bus addresses from the address storage 506 of the bus monitor circuit 502. If the addresses captured by the address checker match the addresses read from the bus monitor, the address channel is functioning properly. Otherwise, the address checker can report an error by generating an interrupt or storing an error status code in a memory (not shown). In one implementation, the address checker may be configured to capture only the addresses of bus transactions generated by the data pattern checker program.

The bus monitor circuit and address checker software may be used as an alternative to the error code generator circuit and error code checker circuit or in combination therewith, depending on implementation requirements.

FIG. 6 is a flowchart of a process for checking for errors on the address channel using the bus monitor. At block 602 the address checker program (FIG. 5, 504) executing on the bus master circuit stores the addresses and transaction identifiers of bus transactions issued from the bus master circuit. The address checker program then reads the addresses that were captured by the bus monitor circuit (FIG. 5, 502) at block 604. If the addresses read from the bus monitor circuit are not equal to the addresses stored by the address checker program, decision block 606 directs the process to block 608. Otherwise, the process is directed to block 610. At block 608, the address checker program signals that an error was detected on the address channel.

At block 610, the process waits before repeating the address data channel check. In an example implementation, the address channel check is performed periodically. The process waits for a period of time that may be specified by a configuration parameter before returning to block 602 to repeat the process.

Figure 7:
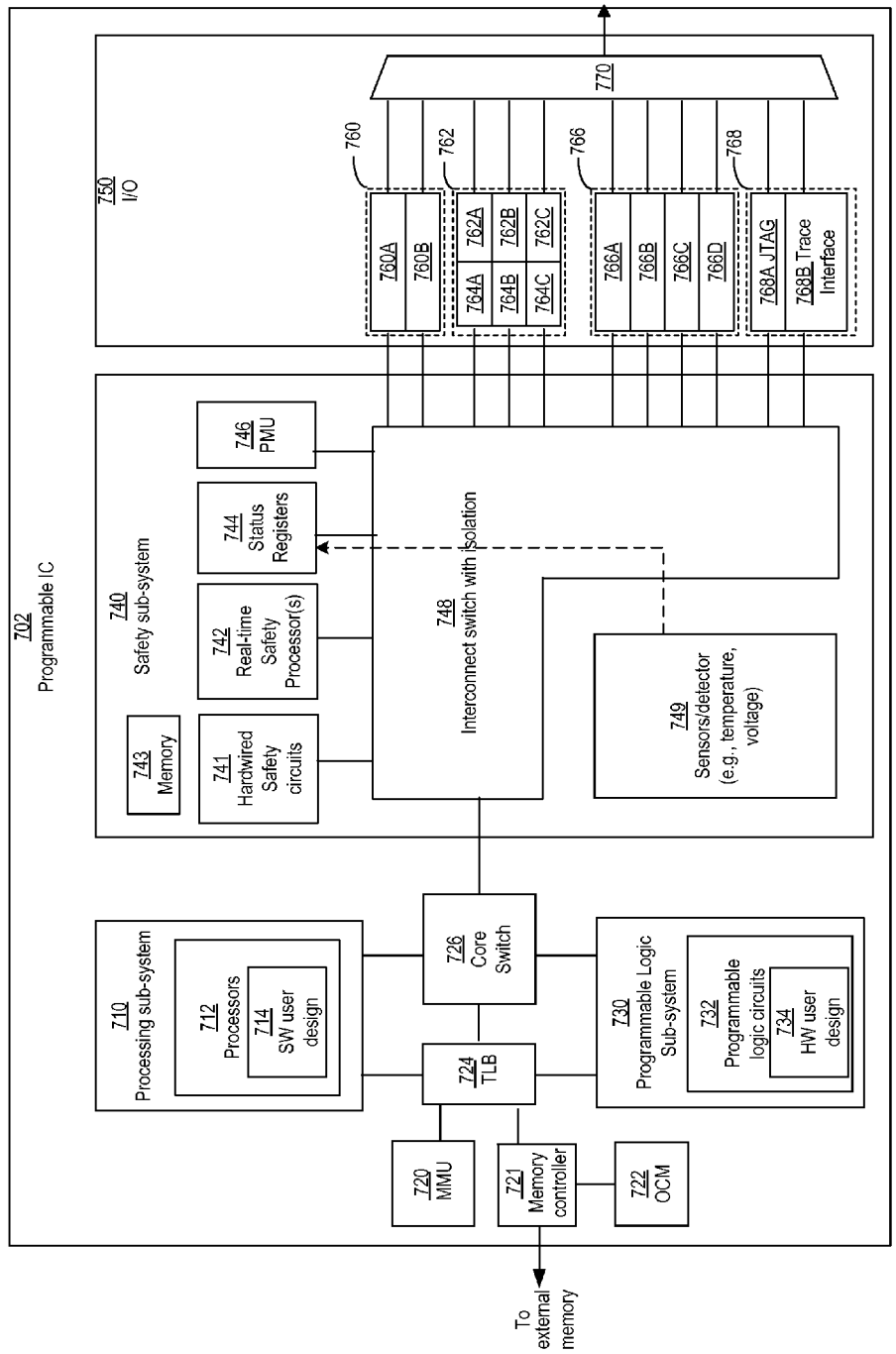
FIG. 7 shows a programmable IC that may be configured consistent with one or more implementations.

FIG. 7 shows a programmable IC 702 that may be configured in accordance with one or more implementations as described above. The programmable IC may also be referred to as a System-on-chip (SOC), which includes a processing sub-system 710 and a programmable logic sub-system 730. The processing sub-system 710 may be programmed to implement a software portion of the user design, via execution of a user program. The program may be specified as part of a set of configuration data or may be retrieved from an on-chip or off-chip data storage device. The processing sub-system 710 may include various processing circuits 712 for executing a software implementation of a user design 714. The processing circuits 712 may include, for example, one or more processor cores, floating point units (FPUs), an interrupt processing unit, on chip-memory, memory caches, and/or a cache coherent interconnect.

The programmable logic sub-system 730 of the programmable IC 702 may be programmed to implement a hardware portion of a user design. For instance, the programmable logic sub-system may include a number of programmable logic circuits 732, which may be programmed to implement a set of circuits specified in a set of configuration data. The programmable logic circuits 732 include programmable interconnect circuits, programmable logic circuits, and configuration memory cells. The programmable logic implements the logic of a user design using programmable elements that can include, for example, function generators, registers, arithmetic logic, and so forth. Programmable interconnect circuits may include a large number of interconnect lines of varying lengths interconnected by programmable interconnect points (PIPs).

The programmable logic circuits 732 may be programmed by loading a set of configuration data into the configuration memory cells, which define how the programmable interconnect circuits and programmable logic circuits are configured. The collective states of the individual memory cells then determine the function of the programmable logic circuits 732. The configuration data can be read from memory (e.g., from an external PROM) or written into the programmable IC 702 by an external device. In some implementations, configuration data may be loaded into configuration memory cells by a configuration controller 734 included in the programmable logic sub-system 730. In some other implementations, the configuration data may be loaded into the configuration memory cells by a start-up process executed by the processing sub-system 710.

The programmable IC 702 may include various circuits to interconnect the processing sub-system 710 with circuitry implemented within the programmable logic sub-system 730. Connections between circuits and sub-systems are illustrated as lines in FIG. 7. The various connections may be single or multi-bit signal lines and may be uni-directional or bi-directional. In this example, the programmable IC 702 includes a core switch 726 that can route data signals between various data ports of the processing sub-system 710 and the programmable logic sub-system 730. The core switch 726 may also route data signals between either of the programmable logic or processing sub-systems 710 and 730 and various other circuits of the programmable IC, such as an internal data bus. Alternatively or additionally, the processing sub-system 710 may include an interface to directly connect with the programmable logic sub-system—bypassing the core switch 726. Such an interface may be implemented, for example, using the AMBA AXI Protocol Specification (AXI) as published by ARM.

In some implementations, the processing sub-system 710 and the programmable logic sub-system 730 may also read or write to memory locations of an on-chip memory 722 or off-chip memory (not shown) via memory controller 721. The memory controller 721 can be implemented to communicate with one or more different types of memory circuits including, but not limited to, Dual Data Rate (DDR) 2, DDR3, Low Power (LP) DDR2 types of memory, whether 16-bit, 32-bit, 16-bit with ECC, etc. The list of different memory types with which memory controller 721 is able to communicate is provided for purposes of illustration only and is not intended as a limitation or to be exhaustive. As shown in FIG. 7, the programmable IC 702 may include a memory management unit 720 and translation look-aside buffer 724 to translate virtual memory addresses used by the sub-systems 710 and 730 to physical memory addresses used by the memory controller 721 to access specific memory locations.

The programmable IC may include an input/output (I/O) sub-system 750 for communication of data with external circuits. The I/O sub-system 750 may include various types of I/O devices or interfaces including for example, flash memory type I/O devices, higher performance I/O devices, lower performance interfaces, debugging I/O devices, and/or RAM I/O devices.

The I/O sub-system 750 may include one or more flash memory interfaces 760 illustrated as 760A and 760B. For example, one or more of flash memory interfaces 760 can be implemented as a Quad-Serial Peripheral Interface (QSPI) configured for 4-bit communication. One or more of flash memory interfaces 760 can be implemented as a parallel 8-bit NOR/SRAM type of interface. One or more of flash memory interfaces 760 can be implemented as a NAND interface configured for 8-bit and/or 16-bit communication. It should be appreciated that the particular interfaces described are provided for purposes of illustration and not limitation. Other interfaces having different bit widths can be used.

The I/O sub-system 750 can include one or more interfaces 762 providing a higher level of performance than flash memory interfaces 760. Each of interfaces 762A-762C can be coupled to a DMA controller 764A-764C respectively. For example, one or more of interfaces 762 can be implemented as a Universal Serial Bus (USB) type of interface. One or more of interfaces 762 can be implemented as a gigabit Ethernet type of interface. One or more of interfaces 762 can be implemented as a Secure Digital (SD) type of interface.

The I/O sub-system 750 may also include one or more interfaces 766 such as interfaces 766A-766D that provide a lower level of performance than interfaces 762. For example, one or more of interfaces 766 can be implemented as a General Purpose I/O (GPIO) type of interface. One or more of interfaces 766 can be implemented as a Universal Asynchronous Receiver/Transmitter (UART) type of interface. One or more of interfaces 766 can be implemented in the form of a Serial Peripheral Interface (SPI) bus type of interface. One or more of interfaces 766 can be implemented in the form of a Controller-Area-Network (CAN) type of interface and/or an $I^2C$ type of interface.

The I/O sub-system 750 can include one or more debug interfaces 768 such as processor JTAG (PJTAG) interface 768A and a trace interface 768B. PJTAG interface 768A can provide an external debug interface for the programmable IC 702. Trace interface 768B can provide a port to receive debug, e.g., trace, information from the processing sub-system 710 or the programmable logic sub-system 730.

As shown, each of interfaces 760, 762, 766, and 768 can be coupled to a multiplexer 770. Multiplexer 770 provides a plurality of outputs that can be directly routed or coupled to external pins of the programmable IC 702, e.g., balls of the package within which the programmable IC 702 is disposed. For example, I/O pins of programmable IC 702 can be shared among interfaces 760, 762, 766, and 768. A user can configure multiplexer 770, via a set of configuration data to select which of interfaces 760-768 are to be used and, therefore, coupled to I/O pins of programmable IC 702 via multiplexer 770. The I/O sub-system 750, may also include a fabric multiplexer I/O (FMIO) interface (not shown) to connect interfaces 762-768 to programmable logic circuits of the programmable logic sub-system. Additionally or alternatively, the programmable logic sub-system 730 can be configured to implement one or more I/O circuits within programmable logic. In some implementations, the programmable IC 702 may also include a sub-system 740 having various circuits for power and/or safety management. For example, the sub-system 740 may include a power management unit 746 configured to monitor and maintain one or more voltage domains used to power the various sub-systems of the programmable IC 702. In some implementations, the power management unit 746 may disable power of individual sub-systems, when idle, to reduce power consumption, without disabling power to sub-systems in use.

The sub-system 740 may also include safety circuits to monitor the status of the sub-systems to ensure correct operation. For instance, the sub-system 740 may include one or more hard-wired safety circuits 741 configured to perform safety functions for various sub-systems or circuits of the programmable IC. The sub-system 740 may also include one or more real-time processors 742 configured to execute various software-based safety functions for various sub-systems or circuits of the programmable IC.

The sub-system 740 may include one or more sensors or detectors 749 configured to monitor various operating parameters of the programmable IC (e.g., voltage, temperature, clocks and/or data/control signals) and store data indicating the status of the monitored operating parameters in status registers 744. Data flow from the sensors or detectors 749 to the status registers via interconnect switch 748 is illustrated by a dashed line in FIG. 7. The status registers may be accessed, by the hard-wired safety circuits 741, real-time processors 742, or power management unit 746.

The safety functions may monitor the status of the various sub-systems and perform various actions to facilitate detection, prevention, and/or mitigation of errors in one or more sub-systems or circuits. In some implementations, the safety functions may take action in response to the status registers having values indicative of an error. For example, a safety function may generate an alert in response to detecting an error. As another example, a safety function may reset an individual sub-system to attempt to restore the sub-system to correct operation, as discussed with reference to FIGS. 1 and 2.

Sub-systems or circuits to be monitored and conditions in which sub-systems are to be reset may be specified in a safety policy stored in a memory 743. The safety policy performed by the safety sub-system may be hardcoded in a non-volatile memory or may be stored in the memory at startup. In some implementations, the safety policy may be user configurable and provided, for example, in a subset of a set of configuration data.

The sub-system 740 includes an interconnect switch network 748 that may be used to interconnect various sub-systems. For example, the interconnect switch network 748 may be configured to connect the various sub-systems 710, 730, and 740 to various interfaces of the I/O sub-system 750. In some applications, the interconnect switch network 748 may also be controlled by one or more safety functions of the hard-wired safety circuits 741 or real-time safety processors 742 to isolate the real-time processors 742 from the sub-systems that are to be monitored. Such isolation may be required by certain application standards (e.g., IEC-61508 SIL3 or ISO-26262 standards) to ensure that the real-time processors 742 are not affected by errors that occur in other sub-systems. In some applications, interconnect switch network 748 may also be protected (e.g., by ECC or parity) to provide protection against random faults. In some applications, the interconnect switch network 748 may be protected by software-based tests that are periodically performed to test the interconnect switch network 748.

In some implementations, some safety functions may be performed by redundant hard-wired circuits of the hard-wired safety circuits 741. For example, the power management unit 746 may be protected by a safety function performed by a triple modular redundant circuit of the hard-wired safety circuits 741. For example, the hard-wired circuits of the safety sub-system may include a triple modular redundant circuit configured to monitor a power management unit of the programmable IC. As another example, the programmable IC may include a configuration security unit configured to prevent unintended reconfiguration of programmable logic circuits (e.g., during reset of the processing sub-system 710). The configuration security unit may similarly be protected by triple modular redundant circuits.

Though aspects and features may in some cases be described in individual figures, it will be appreciated that features from one figure can be combined with features of another figure even though the combination is not explicitly shown or explicitly described as a combination.

The methods and systems are thought to be applicable to a variety of bus interconnect systems. Other aspects and features will be apparent to those skilled in the art from consideration of the specification. It is intended that the specification and drawings be considered as examples only, with a true scope of the invention being indicated by the following claims.

What is claimed is:

1. A method of detecting faults on a bus interconnect that connects a bus master circuit to bus slave circuits, comprising:
concurrently executing an application program and a fault detection program by the bus master circuit, wherein the application program initiates first bus transactions to the bus slave circuits, and the fault detection program initiates second bus transactions to the bus slave circuits for detection of faults in data channels of the bus interconnect;
wherein the concurrently executing the fault detection program includes for each of the bus slave circuits:
issuing a write transaction that specifies a data pattern and an address of a memory location of the bus slave circuit,
issuing a read transaction that specifies the address of the memory location of the bus slave circuit, and
determining whether or not data returned from the read transaction matches the data pattern;
generating by an error code generator circuit, error codes from addresses of the first and second bus transactions transmitted by the bus master circuit;
transmitting the error codes with the first and second bus transactions on address channels of the bus interconnect to addressed ones of the bus slave circuits;
determining by respective error code checker circuits coupled between the bus interconnect and the bus slave circuits, whether or not the addresses of the bus transactions are correct based on the error codes.

2. The method of claim 1, wherein the concurrently executing the fault detection program includes periodically issuing the second bus transactions to the bus slave circuits.

3. The method of claim 1, wherein the address of the memory location of the bus slave circuit is dedicated to the fault detection program.

4. The method of claim 1, further comprising, in response to one of the respective error code checker circuits determining the address of one of the bus transactions is incorrect, specifying the one of the bus transactions as invalid in bits of the one of the bus transactions.

5. The method of claim 1, further comprising, in response to one of the respective error code checker circuits determining the address of one of the bus transactions is incorrect, changing the address of the one of the bus transactions to an undefined address.

6. The method of claim 1, further comprising:
capturing for each of the bus slave circuits, the addresses of the second bus transactions by a respective bus monitor circuit coupled between the bus interconnect and the bus slave circuit; and
determining by the fault detection program whether or not the addresses captured by the respective bus monitor circuit are correct.

7. The method of claim 6, wherein the concurrently executing the fault detection program includes periodically issuing the second bus transactions to the bus slave circuits.

8. The method of claim 7, wherein:
the periodically issuing the second bus transactions includes, for each of the bus slave circuits:
issuing a write transaction that specifies a data pattern and an address of a memory location of the bus slave circuit; and
issuing a read transaction that specifies the address of the memory location of the bus slave circuit; and
the method further comprising determining whether or not data returned from the read transaction matches the data pattern.

9. The method of claim 8, wherein the address of the memory location of the bus slave circuit is dedicated to the fault detection program.

10. The method of claim 6, further comprising, in response to one of the respective error code checker circuits determining the address of one of the bus transactions is incorrect, specifying the one of the bus transactions as invalid in bits of the one of the bus transactions.

11. The method of claim 1, further comprising, in response to one of the respective error code checker circuits determining the address of one of the bus transactions is incorrect, changing the address of the one of the bus transactions to an undefined address.

12. A circuit arrangement, comprising:
a bus interconnect circuit having address channels and data channels;
a bus master circuit, the bus master circuit configured to concurrently execute an application program and fault detection program, wherein the application program initiates first bus transactions, and the fault detection program initiates second bus transactions for detection of faults in the data channels of the bus interconnect circuit;
wherein execution of the fault detection program causes the bus master circuit to, for each of the bus slave circuits:
issue a write transaction that specifies a data pattern and an address of a memory location of the bus slave circuit,
issue a read transaction that specifies the address of the memory location of the bus slave circuit, and
determine whether or not data returned from the read transaction matches the data pattern;
an error code generator circuit that couples the bus master circuit to the bus interconnect circuit, the error code generator circuit configured to generate for each of the first and second bus transactions, an error code from an address of the bus transaction and transmit the error code on one of the address channels;
a plurality of bus slave circuits; and
a plurality of error code checker circuits that couple the bus slave circuits to the bus interconnect circuit, respectively, each error code checker circuit configured to determine whether or not the address of each received one of the first and second bus transactions is correct based on the error code.

13. The circuit arrangement of claim 12, wherein execution of the fault detection program causes the bus master circuit to periodically issue the second bus transactions to the bus slave circuits.

14. The circuit arrangement of claim 12, wherein the address of the memory location of the bus slave circuit is dedicated to the fault detection program.

15. The circuit arrangement of claim 12, wherein each error code checker circuit is configured to specify the one of the bus transactions as invalid in bits of the one of the bus transactions in response to determining the address of one of the bus transactions is incorrect.

16. The circuit arrangement of claim 12, wherein each error code checker circuit is configured to change the address of the one of the bus transactions to an undefined address in response to determining the address of one of the bus transactions is incorrect.

17. The circuit arrangement of claim 12, further comprising:
- a plurality of bus monitor circuits coupled between the bus interconnect circuit and the bus slave circuits, respectively, wherein each bus monitor circuit is configured to capture the addresses of each of the second bus transactions addressed to the respective bus slave circuit; and
- wherein execution of the fault detection program causes the bus master circuit to determine whether or not the addresses captured by the respective bus monitor circuit are correct.

18. The circuit arrangement of claim 17, wherein execution of the fault detection program causes the bus master circuit to periodically issue the second bus transactions to the bus slave circuits.

\* \* \* \* \*